US011163557B2

(12) United States Patent
Babol et al.

(10) Patent No.: US 11,163,557 B2
(45) Date of Patent: Nov. 2, 2021

(54) AUTOMATED TECHNIQUES FOR DETECTING THE USAGE OF SOFTWARE APPLICATIONS IN A COMPUTING ENVIRONMENT USING CONFIGURATION OBJECTS

(71) Applicant: International Business Machines Corporation, Armonk, NY (US)

(72) Inventors: Adam Babol, Lubartow (PL); Adam Dyszy, Wodzislaw Slaski (PL); Joanna Wawrzyczek, Krakó (PL); Jakub B. Moor, Olkusz (PL); Michal Kmak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 16/677,991

(22) Filed: Nov. 8, 2019

(65) Prior Publication Data
US 2021/0141636 A1 May 13, 2021

(51) Int. Cl.
*G06F 8/71* (2018.01)
*H04L 29/08* (2006.01)
*G06F 8/60* (2018.01)

(52) U.S. Cl.
CPC .............. *G06F 8/71* (2013.01); *G06F 8/60* (2013.01); *H04L 67/34* (2013.01)

(58) Field of Classification Search
CPC ............. G06F 8/71; G06F 8/60; H04L 67/34
See application file for complete search history.

(56) References Cited

U.S. PATENT DOCUMENTS

| 7,506,038 | B1* | 3/2009 | Perrone | G06F 8/60 |
| | | | | 709/220 |
| 7,698,305 | B2* | 4/2010 | Verbowski | G06F 21/57 |
| | | | | 707/999.2 |
| 8,307,355 | B2* | 11/2012 | Capomassi | G06Q 30/0601 |
| | | | | 717/170 |
| 9,395,966 | B1* | 7/2016 | Watson | G06F 8/60 |
| 9,400,992 | B2* | 7/2016 | Di Litta | G06Q 30/0603 |
| 10,313,379 | B1* | 6/2019 | Han | G06N 5/04 |

(Continued)

FOREIGN PATENT DOCUMENTS

CN 110297641 A 10/2019

OTHER PUBLICATIONS

M. Dikaiakos, et al., "Minersoft: Software Retrieval in Grid and Cloud Computing Infrastructures", ACM Transactions on Internet Technology (TOIT), vol. 12, Issue 1, Article No. 2, Jun. 2012, 35 pages.

(Continued)

*Primary Examiner* — Phillip H Nguyen
(74) *Attorney, Agent, or Firm* — Steven Bouknight; Edell, Shapiro & Finnan, LLC (57) ABSTRACT

The systems and methods provided herein provide techniques for discovering applications installed in a cluster-based computing environment. A catalog of signatures is obtained. One or more clusters are scanned to obtain information about configuration parameters in the one or more clusters. The catalog of signatures is compared with the information from scanning comprising configuration parameters to identify software applications installed on a per-cluster basis.

20 Claims, 4 Drawing Sheets

(56) References Cited

U.S. PATENT DOCUMENTS

| | | | |
|---|---|---|---|
| 2008/0133972 A1* | 6/2008 | Verbowski | G06F 21/552 |
| | | | 714/37 |
| 2009/0241105 A1 | 9/2009 | Perrone et al. | |
| 2009/0248636 A1 | 10/2009 | Gangemi et al. | |
| 2010/0257518 A1* | 10/2010 | Baratti | G06F 8/65 |
| | | | 717/168 |
| 2012/0117234 A1 | 5/2012 | Miryanov et al. | |
| 2016/0026449 A1* | 1/2016 | Gierlak | G06F 8/61 |
| | | | 717/175 |
| 2016/0092210 A1 | 3/2016 | Kuchibhotla et al. | |
| 2016/0259804 A1 | 9/2016 | Subramaniam et al. | |
| 2017/0286095 A1 | 10/2017 | Grabska et al. | |
| 2017/0373933 A1 | 12/2017 | Subramanian et al. | |
| 2018/0096042 A1* | 4/2018 | Kuzma | H04L 9/3297 |
| 2019/0079846 A1* | 3/2019 | Shaik | G06F 11/3452 |
| 2019/0155578 A1 | 5/2019 | Brandys et al. | |
| 2020/0034167 A1* | 1/2020 | Parthasarathy | G06F 9/45558 |

OTHER PUBLICATIONS

International Search Report and Written Opinion in corresponding International Application No. PCT/IB2020/060454, dated Feb. 19, 2021, 9 pages.

* cited by examiner

AUTOMATED TECHNIQUES FOR DETECTING THE USAGE OF SOFTWARE APPLICATIONS IN A COMPUTING ENVIRONMENT USING CONFIGURATION OBJECTS

BACKGROUND

1. Technical Field

Present invention embodiments relate to detecting a software application in a computing environment, and more specifically, to automated techniques for detecting a software application in a cluster-based computing environment based on configuration objects.

2. Discussion of the Related Art

In software asset management, an administrator needs to know what types of software applications are installed, and where the application is being used. In cluster-based environments, software applications may be deployed in a container and installed without tags or other annotations that would allow identification of the application.

Traditional techniques for discovering installed applications involve scanning files and file systems in a cluster, which is both time-consuming and computationally intensive.

SUMMARY

According to embodiments of the present invention, automated techniques are provided for detecting software applications installed in a cluster-based computing environment. In particular, configuration objects may be used to identify installed software applications.

Methods, systems and computer readable media for detecting a software application installed in a computing environment are provided. A catalog of signatures is obtained. The computing environment is scanned to obtain information about configuration parameters corresponding to software applications provisioned in the computing environment. The catalog of signatures is compared with the information comprising configuration parameters to determine the software applications in the computing environment. Advantages of this approach include identifying applications without performing scanning operations on the file system.

The computing environment may be a cluster-based computing environment comprising one or more clusters. The determined software applications may be distributed across different clusters to optimize processing. By redistributing or balancing the workload across multiple clusters, which may be based on identification of software applications on particular clusters, computing performance may be improved.

The pods in the one or more clusters may use objects associated with particular configuration parameters. The output of the pods may be compared to the catalog of signatures to identify the software application. Packaging identifying information in pods allows applications to be identified without performing scanning operations on the file system.

The catalog of signatures may include information comprising volumes, commands, configuration parameters, or secrets corresponding to the software application. The signature catalog allows identification of the software applications based on information obtained by scanning operations.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other features and advantages of the present disclosure will become more apparent.

DETAILED DESCRIPTION

Figure 1:
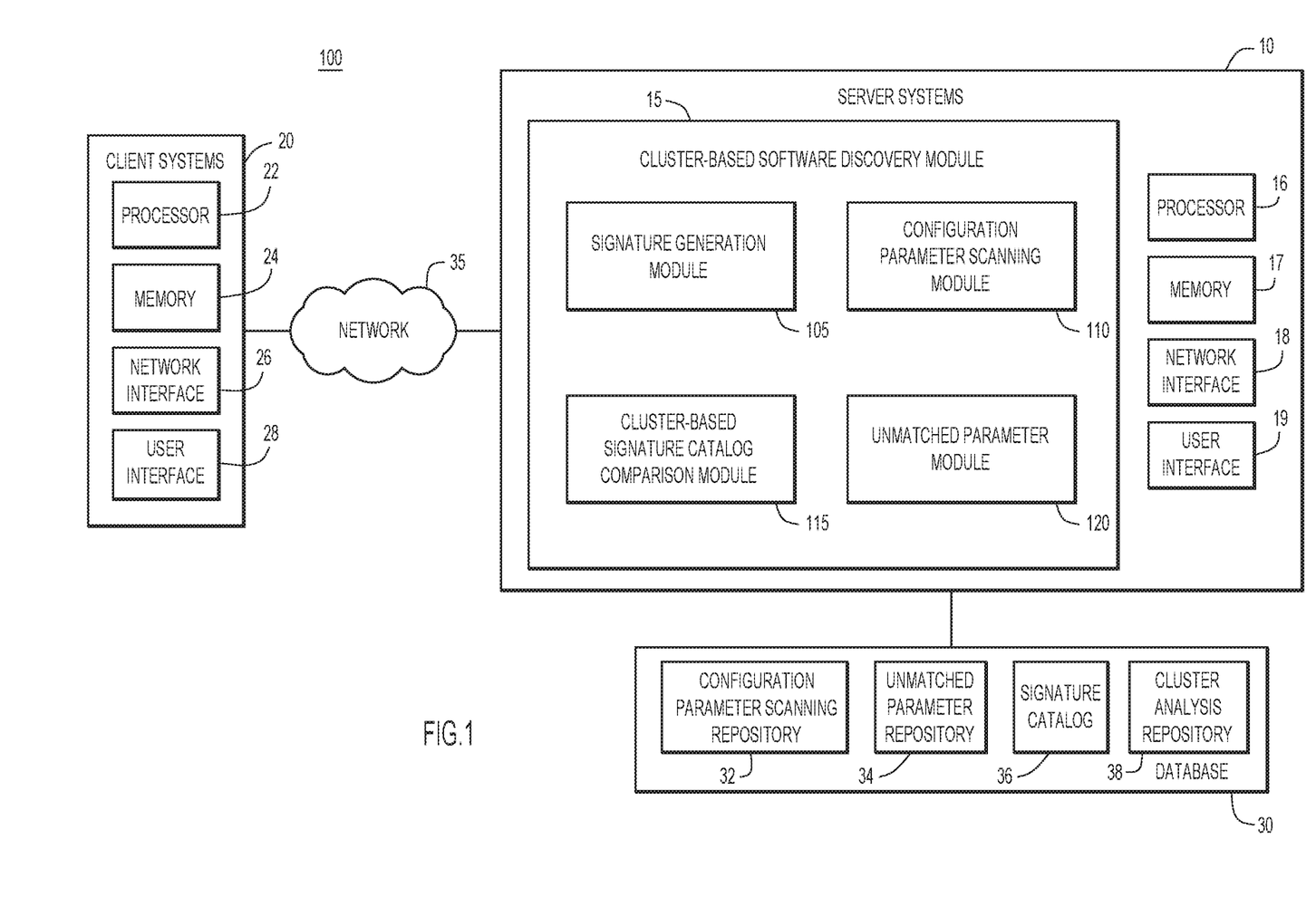
FIG. 1 is a block diagram of an example computing environment for automated detection of software applications in a cluster-based environment in accordance with embodiments of the present disclosure.

An example environment 100 for use with present invention embodiments is illustrated in FIG. 1. Specifically, the environment includes one or more server systems 10, and one or more client or end-user systems 20. Server systems 10 and client systems 20 may be remote from each other and communicate over a network 35. The network may be implemented by any number of any suitable communications media (e.g., wide area network (WAN), local area network (LAN), Internet, Intranet, etc.). Alternatively, server systems 10 and client systems 20 may be local to each other, and may communicate via any appropriate local communication medium (e.g., local area network (LAN), hardwire, wireless link, Intranet, etc.).

Client systems 20 enable users to view the results generated by server system 10. Server systems 10 may include a cluster-based software discovery module 15 to automatically determine which software applications are installed, as described in additional detail below. Although a client server relationship is shown in FIG. 1, it is understood that other configurations are possible.

A database system 30 may store various information for the analysis (e.g., a configuration parameter scanning repository 32, an unmatched signature repository 34, a signature catalog 36, a cluster analysis repository 38, etc.). The database system may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface 28 (e.g., command line prompts, menu screens, etc.) to solicit information from users pertaining to the desired software application usage and analysis, and may provide reports including various analysis results (e.g., software application analytics per cluster, software application version information, location of application installation, presence of duplicate software applications, unmatched software applications, system wide or per-cluster application statistics, etc.).

Configuration parameter scanning repository 32 may contain information obtained from scanning respective clusters, the information comprising volumes, commands, configuration parameters, secrets, or any other information obtained from scanning objects associated with software applications. In some aspects, this information may be compiled over different periods of time, to track application installation during specific time windows.

Unmatched parameter repository 34 may comprise a list of unmatched application parameters, obtained from scanning, which may be provided to signature generation module 105 for further analysis. In some cases, a notification may be sent to a user regarding the unmatched parameters, notifying the user of the unmatched application. Once identified, this signature may be added to the signature catalog 36 for subsequent identification of the corresponding application, and in other clusters.

A signature catalog 36 may include a listing of signatures for installed applications. This catalog may be updated by the signature generation module 105, and as unmatched applications are identified, signatures may be generated for the unmatched applications and added to the signature catalog for subsequent scans. In some cases, the catalog may be configured manually. In other cases, once a sufficient number of catalog entries are available for use as training data, a machine learning system may be trained to construct signatures for the signature catalog from scanned data.

Cluster analysis repository 38 may comprise a list of matched applications and unmatched applications for that cluster. With this information, a computing system may redistribute applications across the computing environment, for example, to help balance computational workload and improve performance of that cluster. In some instances, redistribution may be performed in an automated manner.

Server systems 10 and client systems 20 may be implemented by any conventional or other computer systems preferably equipped with a display or monitor, a base (e.g., including at least one processor 16, 22, one or more memories 17, 24 and/or internal or external network interfaces or communications devices 18, 26 (e.g., modem, network cards, etc.)), optional input devices (e.g., a keyboard, mouse or other input device), user interface 19, 28, and any commercially available and custom software (e.g., server/client communications software, cluster-based software discovery module 15, etc.).

Alternatively, a server may detect the usage of software applications on a per-cluster basis. In this mode of operation, each cluster has access to cluster-based software discovery module 15. The graphical user (e.g., GUI, etc.) or other interface (e.g., command line prompts, menu screens, etc.) solicits information from a corresponding user pertaining to the desired analysis, and may provide reports including analysis results.

Cluster-based software discovery module 15 may include one or more modules or units to perform the various functions of present invention embodiments described herein. The various modules (e.g., signature generation module 105, configuration parameter scanning module 110, cluster-based signature catalog comparison module 115, unmatched parameter module 120, etc.) may be implemented by any combination of any quantity of software and/or hardware modules or units, and may reside within memories 17, 24 of the server and/or client systems for execution by processors 16, 22.

Signature generation module 105 comprises functionality to create a catalog of signatures 36 for software applications. In some aspects, information may be provided to the signature generation module, such as volumes containing configuration files, command line arguments, environmental variables stored inside the application container, configuration maps, and secrets. A secret, which may include a password, an OAuth token, or a ssh key, may be stored in an object to facilitate management of sensitive information. This information may be used to generate signatures for specific applications. Information collected during scanning may be compared to these signatures to identify applications installed on a particular cluster.

Configuration parameter scanning module 110 may scan clusters to identify and collect parameters or other information contained in objects pertaining to their respective applications, which may be deployed in a container. The information obtained from scanning may be compared to the signature catalog 36 generated by signature generation module 105 to identify software applications.

Cluster-based signature catalog comparison module 115 may be used to perform comparisons to identify applications in a cluster. This module may compare information, including but not limited to, volumes containing configuration files, command line arguments, environmental variables inside the container, configuration maps, and secrets (or any other suitable application identifying information contained in an object) to identify the installed applications, for example, by comparing to signature catalog 36. In some cases, a match may be positive provided that there is sufficient similarity between the terms being compared, e.g., the terms do not have to match exactly, but should be similar or have some other feature or combination of unique features to identify the application. In other cases, two, three, four or more parameters may match, to positively identify an application.

Unmatched parameter module 120 identifies parameters obtained during scanning but not matched to a signature in the signature catalog 36. This module may pass a list of the unmatched parameters to signature generation module for further analysis as well as send a notification to a user regarding the unmatched parameters.

Figure 2:
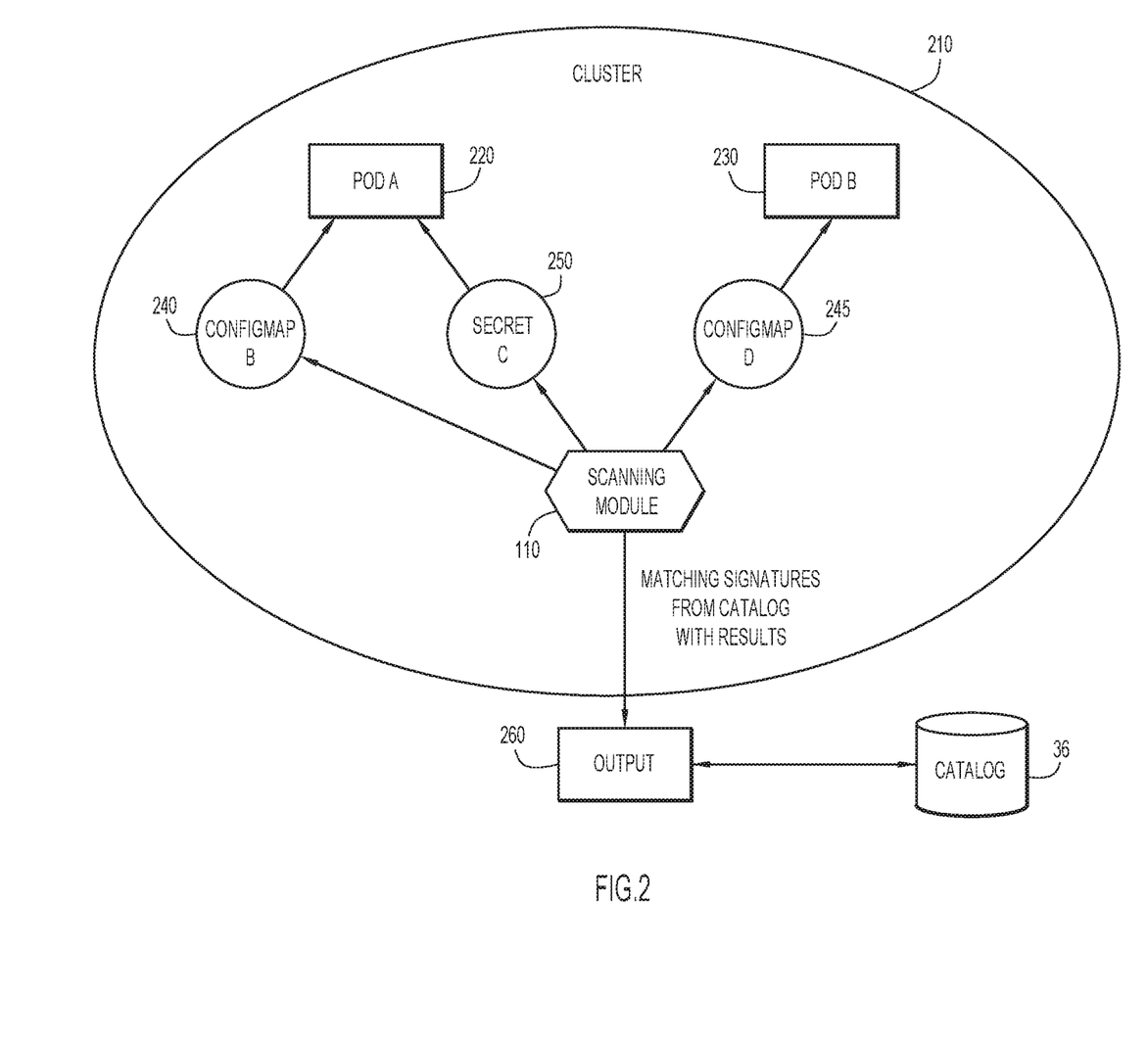
FIG. 2 is a detailed flowchart of operations for automated detection of software applications based on configuration objects, according to embodiments of the present disclosure.

FIG. 2 is an illustration of a cluster-based environment for discovering software applications, based on identification of configuration parameters. The techniques provided herein may be used to discover software provisioned using a container orchestration platform, without tags or annotations, wherein the software is associated with configuration files, commands, environment variables or objects (e.g., secrets, ConfigMaps, etc.). Other examples of configuration parameters include information to switch between application modes and to turn features on or off.

A cluster 210 may comprise a plurality of pods (220, 230), which is the smallest unit of a cluster, and represents a process being executed on the cluster. A pod may be an instance of an application, and may be executed with a single container or with multiple containers.

Containers allow software applications to be packaged such that the software application has no dependences on a particular machine, and therefore, may be executed on any machine in any suitable computing environment. For example, the software application's code, libraries and dependencies may be packaged together into a container. Unlike virtual machines, containers may allow software applications to share the same kernel as the host operating system. Therefore, for operation, it is sufficient to package applications with code and/or libraries not found in the host operating environment. Container orchestration is used to manage software, especially in large, dynamic environments, and may be used to control and automate tasks.

Present techniques allow applications, provisioned on cluster-based infrastructure, to be identified based on associated parameters. These techniques significantly improve detection of application software in clusters. Such configuration information is usually separate from application images so that modification of the configuration information may be performed without rebuilding the application image. Examples of configuration parameters include but are not limited to: volumes in which to place configuration files, command line arguments, environmental variables placed inside a container, configuration maps (ConfigMap APIs 240, 245), secrets 250, as well as other configuration settings. In some aspects, a ConfigMap API object holds key-value pairs of configuration data associated with pods, or other configuration data to identify system components.

An example of an open-source container orchestration platform, Kubernetes, provides a platform with which to manage multiple clusters. Kubernetes objects may store secrets or other sensitive data, such as user name and passwords, etc. Kubernetes may be used to automate the deployment, scaling, and management of containerized applications. This platform also allows containers to be executed on different machines, to scale processes, perform load balancing, and provide additional containers if a provisioned container fails, etc.

Configuration parameter scanning module 110 may be used to scan the cluster for configuration maps, secrets or any other information to identify applications associated with a pod. As indicated previously, configuration parameters may include but are not limited to: volumes, command line arguments, environmental variables inside a container, configuration maps, and secrets. The information obtained from scanning, output 260, may be stored in configuration parameter scanning repository 32, and compared to entries in signature catalog 36.

To use volume based configuration information, a configuration file needs to be placed within the volume. Alternatively, command line arguments may be passed to the application, but may be verbose.

Environmental variables, such as ConfigMaps or secrets, may be included in an application configuration. As an example, in Kubernetes, a ConfigMap, associated with web application software "X" may include the following information:

```
apiVersion: v1
kind: ConfigMap
metadata:
  name: web-app-config
  namespace: default
data:
  web.properties: |
    abc=def
    scanperiod=10s
  ui.properties: |
    color.good=purple
    color.bad=yellow
    allow.textmode=true
    how.nice.to.look=fairlyNice
```

This particular ConfigMap, used in web application "X" may be hardcoded into a signature. The cluster may be scanned, using Kubernetes specific commands (e.g., kubectl describe pod pod_name) or any other suitable API. After scanning the cluster to identify pods, the information may be compared with signature catalog 36 comprising the same or similar information as in ConfigMap to discover software applications.

Figure 3:
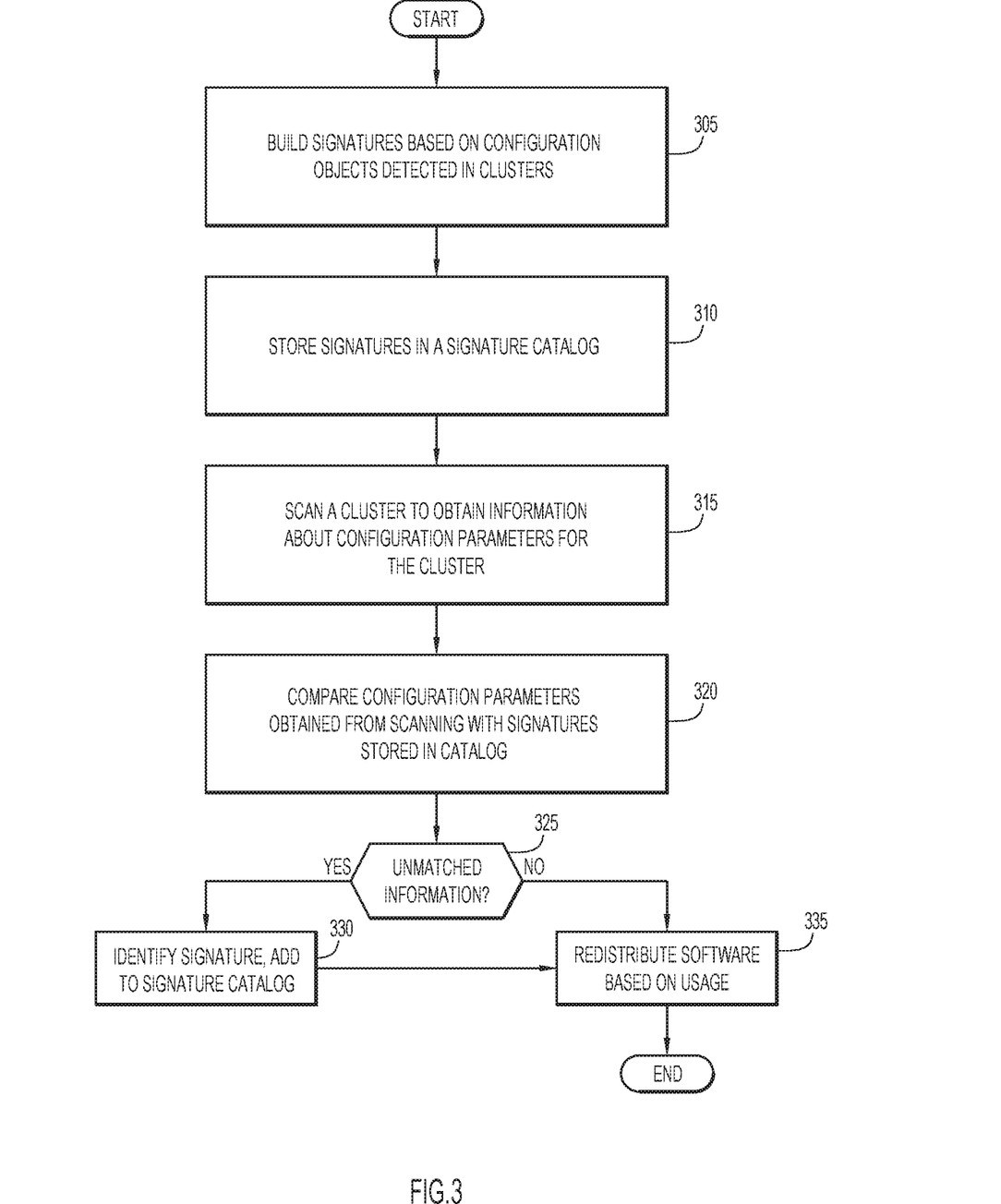
FIG. 3 is a detailed flowchart of operations for automated detection of software application usage in a cluster-based computing environment, according to embodiments of the present disclosure.

FIG. 3 shows example operations performed by the modules listed above in FIG. 1. With reference to cluster-based software discovery module 15, at operation 205, a signature for an application may be built, using signature generation module 105. Signatures may include any suitable configuration object information, including volumes, command line arguments, or configuration parameters.

In some cases, once a sufficient number of catalog entries are available for use as training data, a machine learning system may be trained to construct signatures for the signature catalog from scanned data. In such cases, the system may automatically identify information and use such information to construct signatures from installed software applications based on configuration parameters of the installed software package. Accordingly, signature generation at operation 305 may be configured to occur automatically.

At operation 310, this information may be hardcoded into a signature that is stored in signature catalog 36. This process may also be performed automatically, once relevant configuration parameters are identified.

At operation 315, a cluster (see, FIG. 2) may be scanned to obtain information about configuration parameters in that cluster, e.g., for one or more pods. The system may scan clusters at periodic intervals or as new software applications are provisioned. The system may store this scanned information in configuration parameter scanning repository 32.

At operation 320, the scanned information comprising configuration parameters is compared with the catalog signatures to determine if there is a match indicating that the application is installed on that cluster. In some aspects, the catalog signatures may be generated prior to scanning to facilitate comparison of the scanned information to the reference catalog signatures. In other aspects, the catalog signatures may be updated in information changes, e.g., the signature may be updated to reflect a secret change (e.g., change in access, change of password, etc.).

At operation 325, if there is unmatched information, the system will further process the information using, for example, identification techniques based on similarity. For example, behavioral signature matching may perform matching based on a degree of similarity, while not requiring an exact match between the scanned information and signature catalog.

If there is no unmatched information, the system proceed to operation 335, wherein the information may be used to analyze software application distribution across one or more clusters. This may allow redistribution or other provisioning of resources, load balancing, or other operations to improve performance of a cluster-based computing environment.

Figure 4:
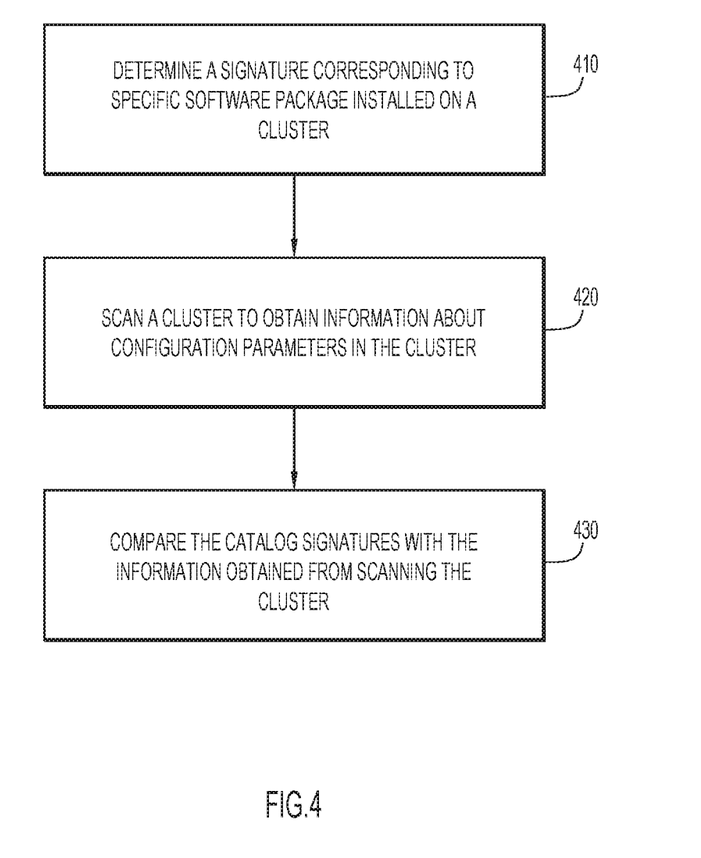
FIG. 4 is a high level flowchart of operations for automated detection of software applications in a cluster-based computing environment, according to embodiments of the present disclosure.

FIG. 4 shows high level operations of detecting software applications that have been installed in a cluster-based environment. At operation 410, a signature is determined corresponding to specific software package installed on a cluster. Signatures may be built based on configuration objects existing in clusters which may contain configuration parameters including configuration maps, secrets (e.g. passwords, usernames, etc.), commands, or other application configurations (e.g., run app with development, debug modes, ports to export, etc.), environmental variables, volumes, etc. This information may be stored in a catalog.

At operation 420, a cluster may be scanned to gather information about configuration parameters and objects in that cluster (e.g., including kubernetes or nomad type clusters).

At operation 430, scanned results may be compared with catalog signatures to identify software applications. With this information, applications may be moved to different clusters to optimize resources and computing loads, to improve performance of the cluster-based computing environment. Further, identifying the application used on a cluster may be useful for licensing management or other audit or informational purposes.

Methods, systems and computer readable media are provided herein, which provide a way to identify software application installed in a cluster-based environment, in an automated manner. Further, the techniques are adaptable to changing configuration parameters, as the techniques may identify software applications based on similarity. Thus, a match may be made if configuration parameters are altered, but within a similarity threshold, due to upgrades or new releases for that application.

These techniques can be extended across cluster-based environments to make decisions regarding software installation and to better utilize software resources. For example, this information may be analyzed to determine distribution and usage of installed software on a per cluster basis. These techniques may be performed on a periodic basis in order to account for changes in the cluster (e.g., addition or removal of pods).

The approaches described herein have several advantages. For example, applications may be identified without lengthy scanning operations on file systems. Unmatched parameters may be provided to the system for further processing. In some cases, the system may identify software that is no longer needed on that cluster, and the application may be automatically removed or uninstalled, e.g., to free up a license for another user in another computing environment or to free up resources on the cluster. In other cases, the system may provide a notification to a network administrator regarding unmatched applications on the cluster. In still other aspects, the system may redistribute software for reconfiguring clusters to improve performance of the system.

It will be appreciated that the embodiments described above and illustrated in the drawings represent only a few of the many ways of implementing embodiments for automatically determining software applications in a cluster.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, cluster-based software discovery module 15, etc.). These systems may include any type of monitors and input devices (e.g., keyboard, mouse, voice recognition, etc.) to enter and/or view information.

It is to be understood that the software (e.g., cluster-based software discovery module 15, including a signature generation module 105, a configuration parameter scanning module 110, a cluster-based signature catalog comparison module 115, an unmatched parameter module 120, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., cluster-based software discovery module 15, including a signature generation module 105, a configuration parameter scanning module 110, a cluster-based signature catalog comparison module 115, an unmatched parameter module 120, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., cluster-based software discovery module 15, including a signature generation module 105, a configuration parameter scanning module 110, a cluster-based signature catalog comparison module 115, an unmatched parameter module 120, etc.). The database system may be implemented by any number of any conventional or other databases, data stores or storage structures (e.g., files, databases, data structures, data or other repositories, etc.) to store information (e.g., configuration parameter scanning repository 32, unmatched parameter repository 34, signature catalog 36, and cluster analysis repository 38, etc.). The database system may be included within or coupled to the server and/or client systems. The database systems and/or storage structures may be remote from or local to the computer or other processing systems, and may store any desired data (e.g., configuration parameter scanning repository 32, unmatched parameter repository 34, signature catalog 36, and cluster analysis repository 38, etc.).

The present invention embodiments may employ any number of any type of user interface (e.g., Graphical User Interface (GUI), command-line, prompt, etc.) for obtaining or providing information (e.g., configuration parameter scanning repository 32, unmatched parameter repository 34, signature catalog 36, and cluster analysis repository 38, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the cluster-based software discovery module 15 may include any information arranged in any fashion, and may be configurable based on rules or other criteria to provide desired information to a user (e.g., analysis results, listing of software applications, signature catalogs, distribution of applications in one or more clusters, etc.).

The present invention embodiments are not limited to the specific tasks or algorithms described above, but may be utilized for any application in which automated identification of software application is useful. Further, this approach may be generally applicable to mitigate any identifying or other information in any context, and is not limited to any particular application domain, such as manufacturing, health, or other domains.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting a software application installed in a computing environment, the method comprising:
    obtaining a catalog of signatures and constructing at least one signature for the catalog of signatures based on configuration information of installed software by a machine learning system trained with a training set of signatures from the catalog of signatures;
    scanning configuration objects of the computing environment to obtain configuration parameters corresponding to software applications provisioned in the computing environment, wherein the configuration parameters include volumes in which to place configuration files, environmental variables placed inside a container, and configuration maps; and
    comparing the catalog of signatures to the configuration parameters to determine the software applications provisioned in the computing environment.

2. The method of claim 1, wherein the computing environment is a cluster-based computing environment comprising one or more clusters.

3. The method of claim 2, wherein the method further comprises:
    redistributing the determined software applications across different clusters to optimize processing.

4. The method of claim 2, further comprising:
    determining which pods in the one or more clusters use objects associated with particular configuration parameters; and
    comparing outputs of the pods to the catalog of signatures to identify the software applications.

5. The method of claim 2, wherein the cluster-based computing environment comprises a kubernetes cluster or a nomad cluster.

6. The method of claim 1, wherein the software applications are packaged in a container.

7. The method of claim 1, wherein the catalog of signatures includes information comprising volumes, commands, configuration parameters, or secrets corresponding to the software applications.

8. A system for detecting a software application installed in a computing environment comprising one or more processors configured to:
    obtain a catalog of signatures and construct at least one signature for the catalog of signatures based on configuration information of installed software by a machine learning system trained with a training set of signatures from the catalog of signatures;
    scan configuration objects of the computing environment to obtain configuration parameters corresponding to software applications provisioned in the computing environment, wherein the configuration parameters include volumes in which to place configuration files, environmental variables placed inside a container, and configuration maps; and compare the catalog of signatures to the configuration parameters to determine the software applications provisioned in the computing environment.

9. The system of claim 8, wherein the computing environment is a cluster-based computing environment comprising one or more clusters.

10. The system of claim 9, wherein the one or more processors are further configured to:
redistribute the determined software applications across different clusters to optimize processing.

11. The system of claim 9, wherein the one or more processors are further configured to:
determine which pods in the one or more clusters use objects associated with particular configuration parameters; and
compare outputs of the pods to the catalog of signatures to identify the software applications.

12. The system of claim 9, wherein the cluster-based computing environment comprises a kubernetes cluster or a nomad cluster.

13. The system of claim 8, wherein the software applications are packaged in a container.

14. The system of claim 8, wherein the catalog of signatures includes information comprising volumes, commands, configuration parameters, or secrets corresponding to the software applications.

15. A computer program product for detecting a software application installed in a computing environment, the computer program product comprising one or more computer readable storage media collectively having program instructions embodied therewith, the program instructions executable by a processor to:
obtain a catalog of signatures and construct at least one signature for the catalog of signatures based on configuration information of installed software by a machine learning system trained with a training set of signatures from the catalog of signatures;
scan configuration objects of the computing environment to obtain configuration parameters corresponding to software applications provisioned in the computing environment, wherein the configuration parameters include volumes in which to place configuration files, environmental variables placed inside a container, and configuration maps; and
compare the catalog of signatures to the configuration parameters to determine the software applications provisioned in the computing environment.

16. The computer program product of claim 15, wherein the computing environment is a cluster-based computing environment comprising one or more clusters.

17. The computer program product of claim 16, wherein the program instructions are executable to:
redistribute the determined software applications across different clusters to optimize processing.

18. The computer program product of claim 16, wherein the program instructions are executable to:
determine which pods in the one or more clusters use objects associated with particular configuration parameters; and
compare outputs of the pods to the catalog of signatures to identify the software applications.

19. The computer program product of claim 15, wherein the software applications are packaged in a container.

20. The computer program product of claim 15, wherein the catalog of signatures includes information comprising volumes, commands, configuration parameters, or secrets corresponding to the software applications.

* * * * *